United States Patent [19]

Anderson

[11] Patent Number: 5,174,195
[45] Date of Patent: Dec. 29, 1992

[54] DEVICE FOR LOADING FOOD ONTO SKEWERS

[76] Inventor: Gregg A. Anderson, 1173 Doralee Way,, San Jose, Calif. 95125

[21] Appl. No.: 679,971

[22] Filed: Apr. 3, 1991

[51] Int. Cl.⁵ ............................................. A47J 37/04
[52] U.S. Cl. .................................... 99/419; 206/493; 220/501; D7/409
[58] Field of Search .................... 99/419, 537; 211/13; 206/493, 561; 220/501, 507; D7/409

[56] References Cited

U.S. PATENT DOCUMENTS

| D. 252,128 | 6/1979 | Olson | D7/409 |
| 3,579,713 | 5/1971 | Kang et al. | 99/419 |
| 4,429,435 | 2/1984 | Walls | 99/419 |

FOREIGN PATENT DOCUMENTS 32232  10/1970  Japan .................... 99/537

Primary Examiner—Harvey C. Hornsby
Assistant Examiner—Mark Spisich
Attorney, Agent, or Firm—Dennis H. Lambert

[57] ABSTRACT

A device for holding pieces of food for impaling them with a skewer or skewers, includes a base defining a receptacle divided by partitions into a plurality of compartments for receiving individual pieces of food. The compartments are dimensioned to hold a marinating and/or seasoning material in addition to the pieces of food. Guide openings are formed through both end walls in one form of the invention, and are also formed in the partitions in alignment with the openings in the end wall, for properly locating and guiding the skewers through approximately the centers of the pieces of food. The guide openings are differently shaped and spaced in one end of the device for receiving and guiding differently sized skewers, and removable inserts are provided for adapting the size of the compartments to closely hold differently sized pieces of food. The partitions have a thickness dimension which spaces the skewered pieces of food for circulation of heat substantially all around them and more uniform cooking of the food pieces. Further, the guide openings are dimensioned to simultaneously receive and hold a plurality of skewers for storage.

21 Claims, 5 Drawing Sheets

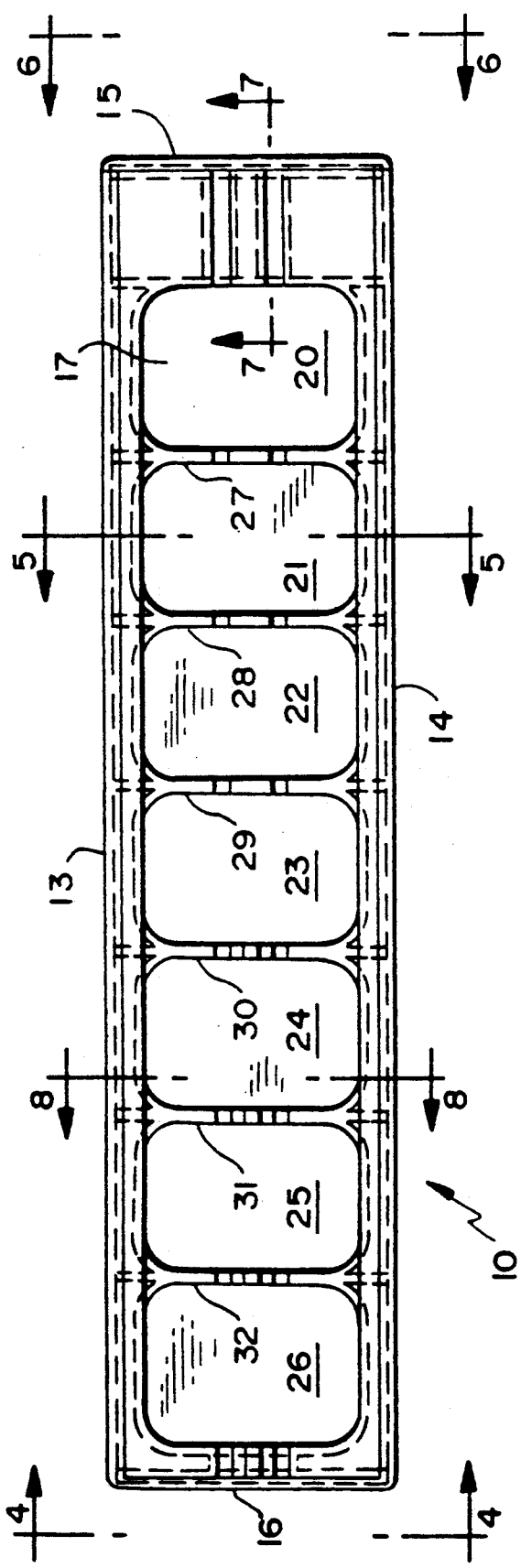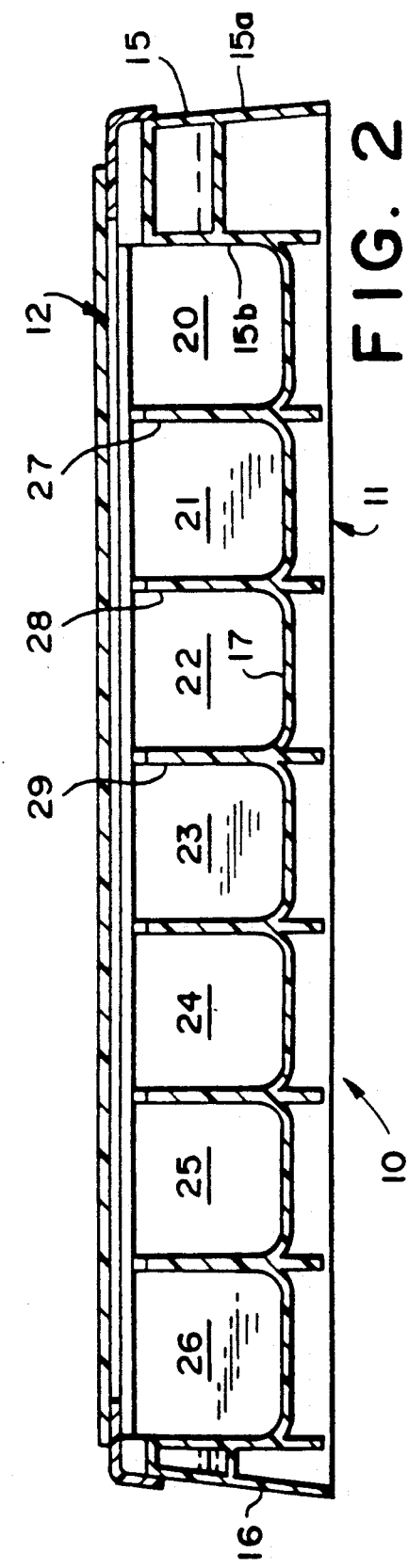

DEVICE FOR LOADING FOOD ONTO SKEWERS

FIELD OF THE INVENTION

This invention relates to cooking utensils, and more particularly, to a device for loading food onto skewers for cooking the food over a grill.

BACKGROUND OF THE INVENTION

Foods which have been broiled or cooked, especially over an open flame, have a unique and popular flavor. Foods prepared by broiling are available in restaurants, and a variety of cooking appliances have been available for years to enable persons to prepare broiled foods at home. These appliances range from grills built into kitchens cabinets in the kitchen to gas-fired or electric or charcoal grills for use outdoors.

One very popular dish that is prepared by broiling is shishkabob. This dish typically comprises alternating pieces of meat, tomatoes, onions, potatoes, carrots, etc. These pieces of food are impaled by an elongate skewer which holds the pieces of food in close proximity to one another for cooking. In the past, these pieces of food were prepared in appropriate bite size chunks and held in one hand while a sharpened skewer was inserted through the food. This technique is not only time-consuming but can be unsanitary and is potentially dangerous to the person loading the food onto the skewer, particularly when impaling pieces of meat, since the resistance encountered may lead to stabbing the skewer into the hand holding the piece of meat. In addition, the first and subsequent pieces of food impaled on the skewer are pushed along the skewer by later pieces of food impaled on the skewer. The pieces of food on a loaded skewer are thus all pressed tightly against one another, and the resultant uneven exposure to heat causes non-uniform cooking of the pieces of food.

A variety of devices have been developed in the prior art for holding pieces of food to be loaded onto skewers, including apparatus which enables multiple skewers to be simultaneously loaded. Many of these prior art devices comprise top and bottom housing portions which are closed onto the food, gripping it and squeezing the food into undulating strips for being impaled by a skewer. These devices are especially adapted for skewering and cooking elongated strips of meat or the like. However, applicant is not aware of any prior art device which is capable of holding a plurality of different types of food in different compartments so that they can be impaled by a skewer that will then hold the pieces of food in spaced relationship on the skewer for cooking. Neither is applicant aware of any prior art device for loading food onto skewers, which can also be used to marinate or season the food.

Accordingly, there is need for a simple and economical device constructed to hold individual pieces of different types of food for impaling them with a skewer for subsequent cooking. Especially desirable would be such a device which is capable of holding or being adapted to hold different size pieces of food and which is arranged to accommodate and guide different types and sizes of skewers. Also desirable would be such a device which has means for marinating or seasoning the food.

SUMMARY OF THE INVENTION

In accordance with the present invention, a unique device is provided for holding a variety of pieces of food so that they can be impaled on a skewer to be cooked.

The device includes a plurality of longitudinally arrayed compartments that are relatively deep and separated by partitions having guide means thereon for guiding a skewer as it is inserted lengthwise through the device. A cover may be placed on the device in closing relationship to the compartments to prevent displacement of food pieces, and enhance the safety of the device.

The partitions separating the interior of the device into the plurality of compartments include variously sized and spaced notches for accommodating different sizes and types of skewers so that the device has universal applicability.

In accordance with one form of the invention, removable inserts are provided to adjust the size of the compartments so that differently sized pieces of food can be firmly held therein. In this regard, the side walls of the compartments are slightly tapered inwardly toward the open upper ends to facilitate holding of pieces of food in the compartments as they are being skewered.

Further, the device of the invention is provided with guide means at both ends so that a skewer can be inserted from either end and be accurately guided through approximately the center of the pieces of food held in the device.

In addition, the relatively deep compartments of the device of the invention make it particularly suitable for use as a marinating and/or seasoning tray, wherein a marinating or seasoning material could be placed in the compartment with the pieces of food and left there for a desired length of time.

Additionally, the partitions between the deep compartments for receiving the individual pieces of food serve as dividers which space the pieces of food from one another on the skewer, thereby enabling improved heat transfer to the pieces of food and improving uniform cooking of the food.

The skewer loading device of the invention also provides several safety features, including the removable cover which may be placed over the device while food is being impaled on the skewer, and especially including the use of the device for holding the food while it is being impaled on the skewers, thereby eliminating the need to hold the pieces of food by hand.

Moreover, the skewer loading device of the invention provides a safe and convenient storage device for a plurality of skewers. In other words, the unique construction of the guide apertures through the partitions in the skewer loading device of the invention are such that a plurality of skewers may be simultaneously placed in the device for storage.

BRIEF DESCRIPTION OF THE DRAWINGS

The foregoing and other objects and advantages of the invention will become apparent from the following detailed description, particularly when considered in conjunction with the accompanying drawings, wherein;

FIG. 2. is a longitudinal sectional view of the device of FIG. 1;

FIG. 3. is a plan view of the compartmented food holding part or base of the device of FIG. 1;

DETAILED DESCRIPTION OF THE PREFERRED EMBODIMENTS

Figure 1:
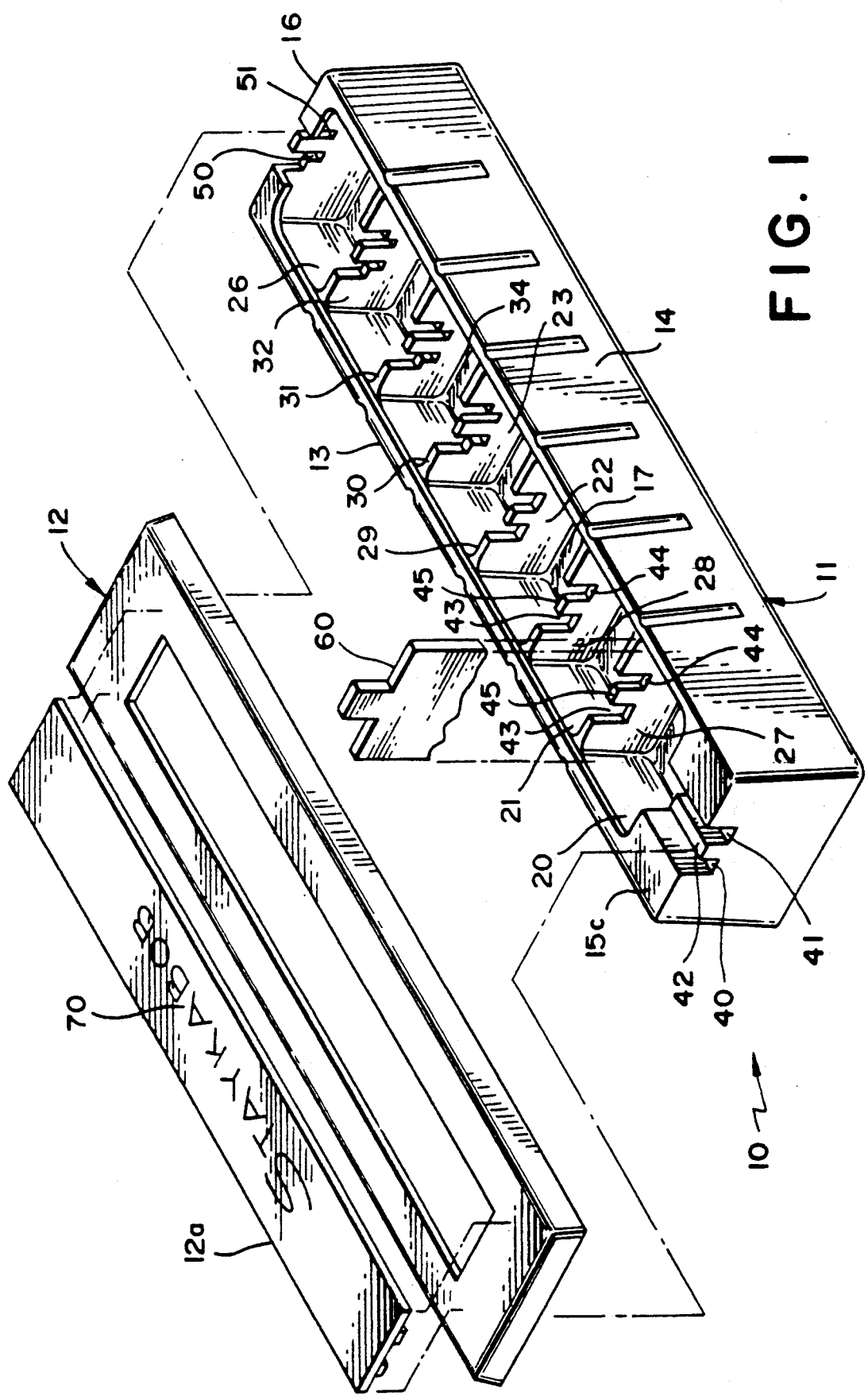
FIG. 1. is an exploded perspective view of a skewer loading device according to a preferred form of the invention.
Figure 6:
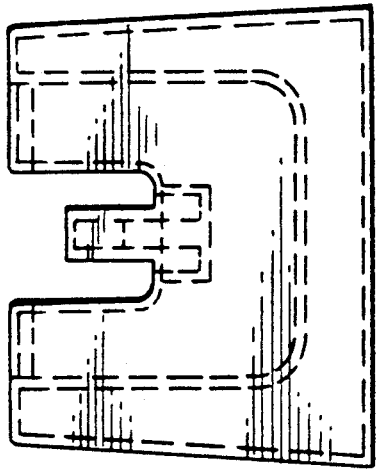
FIG. 6. is an end view taken along line 6—6 in FIG. 3.
Figure 7:
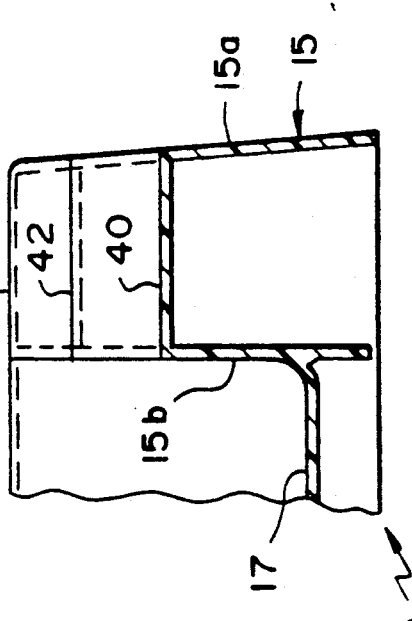
FIG. 7. is a fragmentary sectional view taken along line 7—7 in FIG. 3.

Referring more specifically to the drawings, a preferred form of the skewer loading device according to the invention is indicated generally at 10 in FIGS. 1-7, and comprises a base 11 and cover 12. The base 11 includes opposite, elongate side walls 13 and 14, opposite end walls 15 and 16, and a bottom wall 17, forming a trough-like tray or receptacle. The interior of the base is divided into a plurality of separate compartments 20, 21, 22, 23, 24, 25 and 26, separated by transversely extending partitions 27, 28, 29, 30, 31 and 32. In this connection, the respective compartment 20, 21, etc., are dimensioned to receive in generally close fitting relationship individual pieces of food to be cooked.

With particular reference to FIGS. 1, 2, 3, and 7, the end wall 15 actually comprises an outer wall 15(a) and spaced inner wall 15(b), defining an elongate top wall 15(c). Top wall 15(c) is recessed at two laterally spaced locations 40 and 41 separated by a partition or divider 42. The recessed areas 40 and 41, in cooperation with the partition or separator 42, define guide channels for receiving and guiding the initial insertion of one or two skewers into the pieces of food held in the respective compartments of the food loading device.

Further, each partition 27, 28, 29, etc., is recessed at its upper edge, defining a pair of guide channels 43 and 44 separated by an upstanding partition 45. These guide channels 43 and 44 and the partition 45 are in alignment with the guide channels 40 and 41 and partition 42 on the end wall 15. Accordingly, when a pair of skewers are inserted longitudinally through the guide channels 40 and 41, they are guided into the succeeding guide channels 43 and 44 for accurate positioning of the skewers through the approximate centers of the pieces of food held in the compartments.

Figure 4:
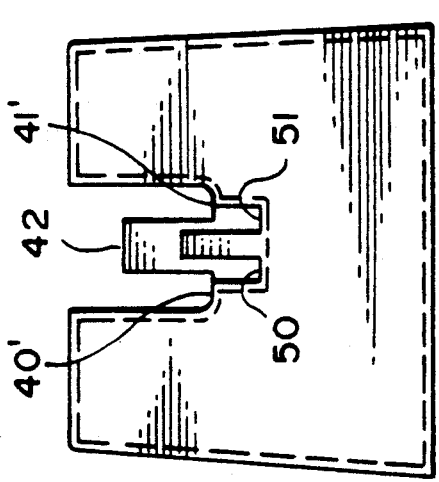
FIG. 4. is an end view taken along line 4—4 in FIG. 3.
Figure 5:
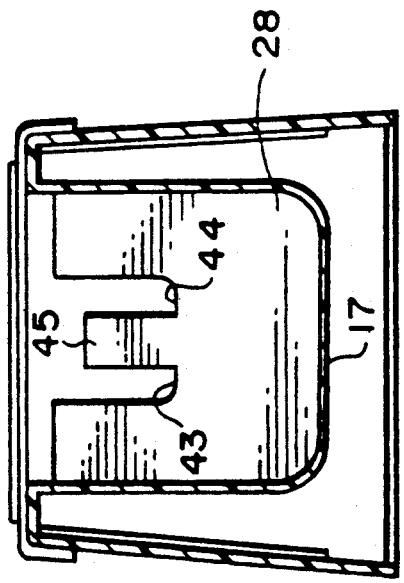
FIG. 5. is a transverse sectional view taken along line 5—5 in FIG. 3.

The opposite end wall 16 is configured slightly differently and includes a pair of additional, more deeply recessed guide channels 50 and 51 at the bottoms of the channels 40' and 41' (see FIG. 4). Moreover, the partitions 30, 31 and 32 include corresponding recessed guide channels 52 and 53 aligned with the guide channels 50 and 51. These more deeply recessed guide channels may be used, for example, with shorter and smaller skewers and/or smaller pieces of food placed in the compartments 23, 24, 25 and 26. Skewering of these pieces of food would be accomplished, for instance, by inserting the skewers through guide channels 50 and 51 in end wall 16 and thence through the aligned recessed guide channels 52 and 53. The device is thus adapted for use with multiple size skewers and multiple size pieces of food.

In addition, removable inserts 60 may be provided for placement in one or more of the food receiving compartments for reducing the size of the compartment and thereby enabling smaller pieces of food to be held closely in the respective compartment.

Further, the inner side walls 13(a) and 14(a), respectively, of the side walls may be manufactured with a slight draft α angle or inward taper toward their upper edges to facilitate holding of food in the compartments. See FIG. 5, for example.

The cover 12 may be produced with a removable insert 12(a) for carrying different indicia 70, as desired. For instance, this insert 12(a) could be produced with suitable indicia for advertising and the like.

The relatively deep compartments 20, 21, etc., may have a suitable marinating sauce or seasoning placed therein for marinating and/or seasoning the pieces of food. For instance, such marinating sauce and pieces of food may be placed in the device and the cover applied for storing the food a predetermined time before the skewers are inserted for cooking the food.

Moreover, the relatively deeply slotted configuration of the skewer guides in the end walls and transverse partitions makes the device capable of storing a plurality of skewers when not in use.

A modified skewer loading device according to the invention is indicated generally at 80 in FIGS. 8-11. In this form of the invention, the base 81 and cover 82, are joined along one side edge by a living hinge 83. A suitable latch mechanism 84 may be provided at the opposite, confronting edges of the base and cover.

In addition, the cover 82 has substantially the same depth or height as the base 81, and the partitions 90, 91, 92, etc., project upwardly above the top edge of the base 81, and into the space defined by the cover 82. These partitions have plural recessed areas 95, 96 and 97 therein, defining guide channels for receiving one or more skewers inserted longitudinally through the device. The bottoms of these guide channels are placed so as to fall approximately at the centers of pieces of food placed in the compartments defined by the base, cover and partitions.

Figure 9:
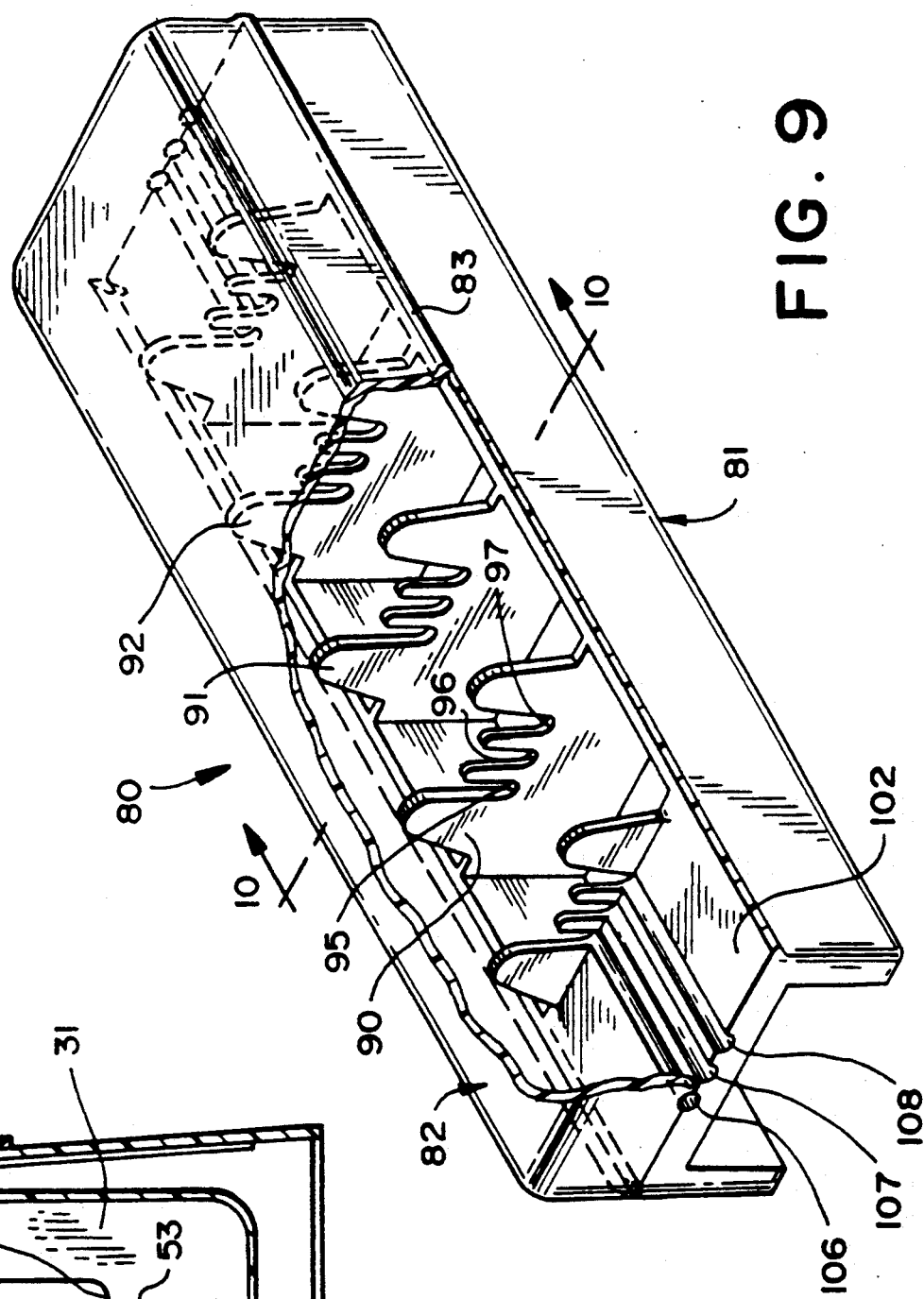
FIG. 9. is a perspective view, with portions broken away and portions shown in dashed lines, of a further form of the invention.
Figure 8:
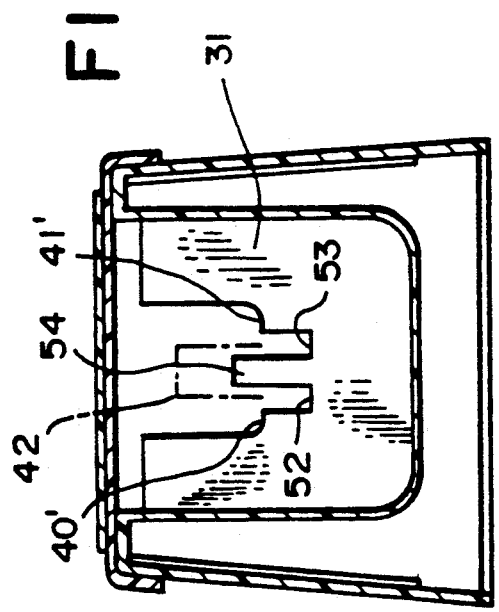
FIG. 8. is a transverse cross-sectional view taken along line 8—8 in FIG. 3.
Figure 12:
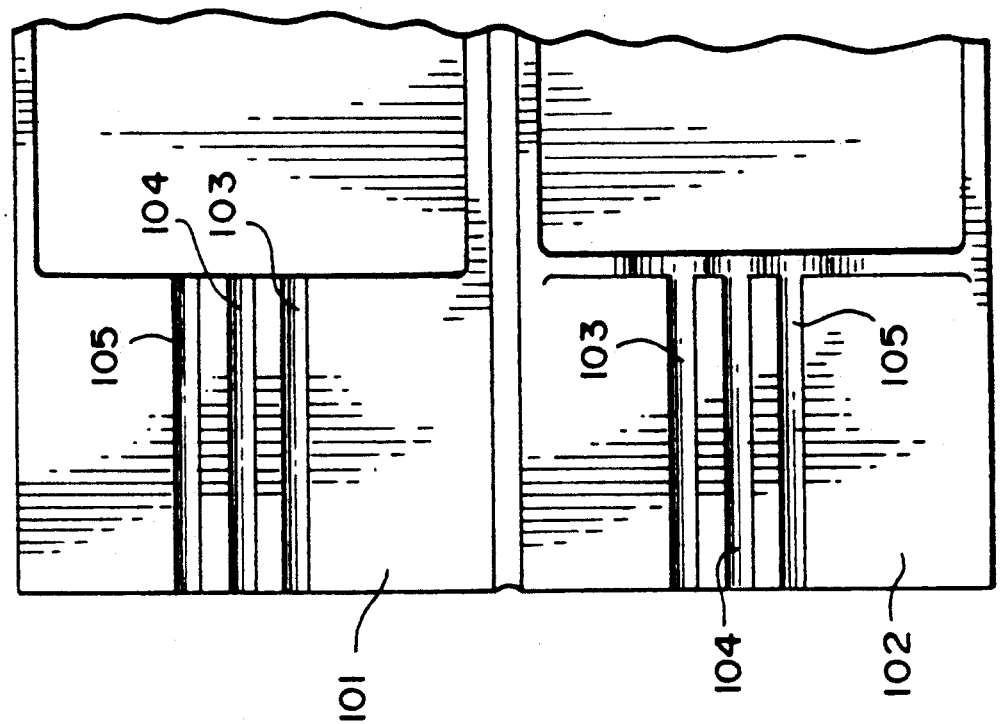
FIG. 12. is a fragmentary plan view looking down on the skewer loading device of FIG. 9 with the cover in open position.
Figure 10:
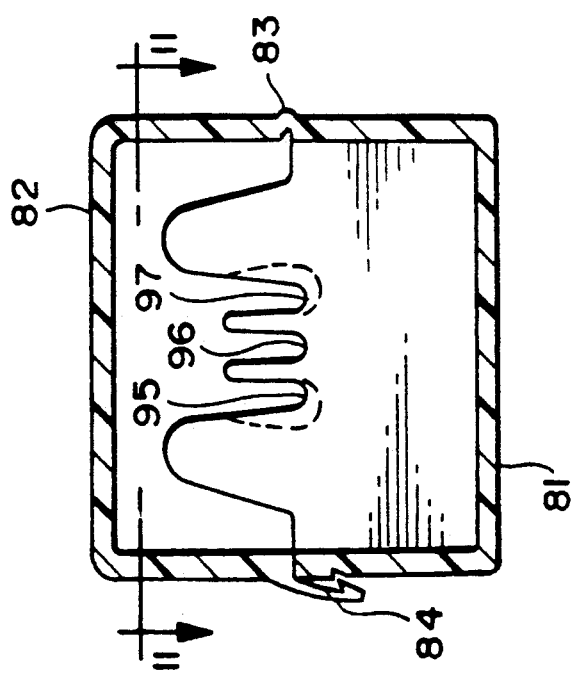
FIG. 10. is a transverse sectional view taken along line 10—10 in FIG. 9.
Figure 11:
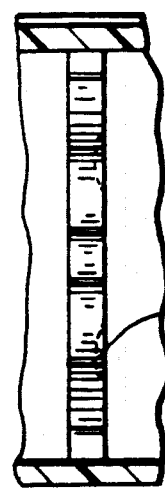
FIG. 11. is a fragmentary view in section taken along line 11—11 in FIG. 10.

As seen in FIGS. 9 and 10, the leading edges of these guide channels may be chamfered as at 100, to facilitate entry of the leading ends of skewers into the guide channels.

In this form of the invention, the cover and base at one of their ends have confronting walls 101, 102, respectively, with mating, semi-circular elongate channels 103, 104 and 105, respectively, formed therein, and when the cover is in closed position on the base, define cylindrically shaped guide openings 106, 107 and 108 in said one end of the device for initially receiving and guiding skewers inserted longitudinally through the device.

Either form of the invention disclosed herein may be made from any suitable material, such as injection molded plastic. Moreover, they may be made in various sizes and shapes, and may even be produced with multiple, side-by-side structures for simultaneously receiving many skewers.

A typical skewer loading device according to the invention may be approximately 12½ inches long, 2 inches high and 2 inches wide. The interior wall portions defining the food receiving compartments preferably have a height of 1.625 inches and a width of 1.625 inches, although other dimensions may obviously be utilized.

Among other things, the skewer loading device of the invention is unique in its provision of relatively deep food receiving compartments that may be used as a marinating or seasoning tray, and the deeply notched partitions which not only serve to maintain the food in spaced apart relation on the skewer but also enable multiple skewers to be stored in the device when not in use.

While the invention has been shown and described in detail, it is obvious that this invention is not to be considered as being limited to the exact form disclosed, and that changes in detail and construction may be made therein within the scope of the invention, without departing from the spirit thereof.

What is claimed is:

1. A device for holding food to be loaded onto skewers, comprising:
   an elongate receptacle divided by a plurality of partitions into a plurality of individual, longitudinally aligned compartments or individually receiving separate pieces of food to be cooked;
   said receptacle having opposite end walls, opposite side walls and a bottom wall;
   guide opening means in at least one of the end walls for receiving and guiding one or more skewers to be inserted longitudinally in the receptacle and through the pieces of longitudinally aligned food received and held in the compartments; and
   said partitions having corresponding guide opening means aligned with the guide opening mean sin said at least one end wall, said guide opening means being dimensioned so as to define an elongated slot which is substantially deeper than it is wide to receive a plurality of skewers in stacked relationship one on top of the other for storage of the skewers.

2. A device for loading food onto skewers, comprising:
   an elongate receptacle having a base with opposite end walls, opposite side walls, a bottom wall and an open top;
   a cover for overlying an d closing said open top;
   a plurality of transversely extending partitions in said base, extending between said side walls and said bottom wall and dividing said base into a plurality f longitudinally aligned compartments dimensioned for receiving individual pieces of food;
   guide opening means formed in said end walls and said partitions for receiving and guiding one or more skewers inserted longitudinally into said receptacle for skewering pieces of food held in the compartments, said guide opening means being dimensioned and positioned to locate said skewers substantially through the centers of the pieces of food; and
   said guide opening means formed in one of said end walls and at least one of said partitions closest to said one end wall being differently dimensioned and configured from the other guide opening means for accommodating differently sized skewers through said one end wall.

3. A device as claimed in claim 2, wherein:
   a removable spacer is provided in at least one of the compartments for changing the size of the compartment to closely hold a smaller piece of food placed therein.

4. A combined marinating tray and food holding device for safely holding a plurality of pieces of food while one or more elongate skewers are inserted through the pieces of food to form shishkabob for subsequent cooking, comprising:
   an elongate receptacle having a bottom wall, opposite end walls and opposite side walls, and an open top closable by a cover;
   a plurality of partition means spaced apart along the length of the receptacle and extending transversely between the side walls, dividing the interior of the receptacle into a plurality of longitudinally adjacent compartments each side and shaped to snugly receive and hold a piece of food, and said compartments further defining reservoirs for receiving and holding a quantity of marinating fluid for marinating a piece of food placed therein;
   said partition means further defining spacer means which causes the pieces of food to be spaced apart on a skewer inserted through the pieces of food while they are held in the receptacle, whereby when the skewered pieces of food are removed for the receptacle and placed on a source of heat to cook the food, the heat is enabled to circulate substantial completely around the food pieces, thereby enhancing the uniformity and speed of cooking of the food pieces; and
   guide opening means formed in the end walls and partition means for receiving and guiding a skewer inserted therethrough so that the skewer extends through substantially the center of the pieces of food held in the compartments;
   said guide opening means being formed as elongate slots extending generally one-half the depth of the compartment;
   said food holding device thereby facilitating the ease and speed of impaling a plurality of pieces of food on a skewer, and without the attendant danger of accidental injury to the person loading the food onto the skewer, which might otherwise occur with conventional methods.

5. A device as claimed in claim 4, wherein:
   the guide opening means in said partition means are aligned with the guide opening means in said end walls, whereby the skewers are maintained in proper relationship throughout the length of the device.

6. A device as claimed in claim 4, wherein:
   said compartments are each constructed and dimensioned to hold a quantity of marinating or seasoning fluid and the like, and a piece of food substantially immersed therein.

7. A device as claimed in claim 4, wherein:
   both said end walls have guide opening means for receiving and guiding from either end of the receptacle one or more skewers to be inserted longitudinally in the receptacle and through the pieces of longitudinally aligned food received in the compartments.

8. A device as claimed in claim 4, wherein:
   a removable spacer is provided in at least one of the compartments for changing the size of the compartment to closely hold a smaller piece of food placed therein.

9. A device as claimed in claim, 4, wherein:
a removable spacer is provided in at least one of the compartments for changing the size of the compartment to closely hold a smaller piece of food placed therein.

10. A food holding device as claimed in claim 4, wherein:
the guide opening means in the end walls are elongate and having a substantial length so as tot maintain the skewers in properly aligned relationship with the compartments and pieces of food contained therein as the skewers are inserted threrthrough, both said end walls having guide opening means therein so that a skewer may be inserted into the receptacle from either end thereof.

11. A device as claimed in claim 10, wherein:
said compartments are each constructed and dimensioned to hold a quantity of marinating or seasoning fluid and the like, and a piece of food substantially immersed therein.

12. A device as claimed in claim 10, wherein:
both said end walls have guide opening means for receiving and guiding from either end of the receptacle one or more skewers to be inserted longitudinally in the receptacle and through the pieces of longitudinally aligned food received in the compartments.

13. A device as claimed in claim 10, wherein:
a removable spacer is provided in at least one of the compartments for changing the size of the compartment to closely hold a smaller piece of food placed therein.

14. A device as claimed n claim 10. wherein:
there are a plurality of partitions spaced equidistantly along the length of the receptacle; and
one of said end walls and at least one of said partitions each have multiple, differently positioned guide openings therein for receiving and guiding differently sized and spaced skewers.

15. A food holding device s claimed in claim 4, wherein:
there are two closely laterally spaced apart guide openings in each end wall and in each partition, whereby two skewers may be inserted into the device and through each piece of food held therein so that the pieces of food are each supported on spaced apart skewers, thus preventing turning of the pieces of food on the skewers.

16. A device as claimed in claim 15, wherein:
said compartments are each instructed and dimensioned to hold a quantity of marinating or seasoning fluid and the like, and a piece of food substantially immersed therein.

17. A device as claimed in claim 15, wherein:
both said end walls have guide opening means for receiving and guiding from either end of the receptacle one or more skewers to be inserted longitudinally in the receptacle and through the pieces of longitudinally aligned food received in the compartment.

18. A device as claimed in claim 15, wherein:
a removable spacer is provided in at least one of the compartments for changing the size of the compartment to closely hold a smaller piece of food placed therein.

19. A food holding device as claimed in claim 14, wherein:
the compartments each have a depth and width substantially the same as the depth and width on a piece of food to be placed therein so that the piece of food is snugly held in the compartment without being crushed; and
the guide opening means in the partition means are formed therethrough approximately midway between the top and bottom of the partition means and in alignment with the guide opening mean in the end wall, said guide opening means in the partition means thus being spaced so that a skewer inserted therethrough will penetrate the piece of food hole in an adjoining compartment at approximately the center of the piece of food.

20. A food holding device as claimed in claim 14, wherein:
the guide opening mean in the end walls and partition means are elongated in a direction from the top of the partition means to the bottom thereof and are dimensioned to receive and hold a plurality of skewers placed on top of one another, whereby a plurality of skewers may be stored in the device when it is not in use for loading pieces of food onto a skewer.

21. A food holding device as claimed in claim 4, wherein:
said receptacle side walls sloping inwardly toward one another from the bottom all to the open to to assist in holding pieces of food in the compartments while a skewer is inserted therethrough.

* * * * *